United States Patent [19]

Dykstra et al.

[11] Patent Number: 4,818,017

[45] Date of Patent: Apr. 4, 1989

[54] CONTAINER HOLDER FOR A VEHICLE

[75] Inventors: Ronald A. Dykstra, Holland; James H. Hoeve, Zeeland, both of Mich.

[73] Assignee: Prince Corporation, Holland, Mich.

[21] Appl. No.: 115,521

[22] Filed: Nov. 2, 1987

Related U.S. Application Data

[63] Continuation of Ser. No. 944,989, Dec. 2, 1986, Pat. No. 4,792,184.

[51] Int. Cl.[4] .................................................. A47C 7/62
[52] U.S. Cl. ...................................... 297/194; 297/145; 297/188
[58] Field of Search ............... 297/194, 188, 145, 150, 297/154; 108/25, 26, 44, 45; 248/311.2; 312/312, 314; 220/85 H, 1 R, 410, 408; 215/100 R, 100.5, 903

[56] References Cited

U.S. PATENT DOCUMENTS

| | | | |
|---|---|---|---|
| 1,550,055 | 8/1925 | Augustine | 297/194 X |
| 2,932,423 | 4/1960 | Baumgartner | 220/85 H |
| 3,083,998 | 4/1963 | Morris | 297/194 |
| 3,606,112 | 9/1971 | Cheshier | 108/45 X |
| 3,638,849 | 2/1972 | Goings | 108/44 X |
| 3,690,724 | 9/1972 | Douglas et al. | 297/194 |
| 3,951,448 | 4/1976 | Hawie | 297/194 X |
| 4,163,374 | 8/1979 | Moore et al. | 220/85 HX |
| 4,500,145 | 2/1985 | Fassauere | 312/312 X |
| 4,649,714 | 3/1987 | Lee | 312/312 X |
| 4,666,041 | 5/1987 | Gordon | 220/410 X |

FOREIGN PATENT DOCUMENTS

| 443562 | 12/1925 | Fed. Rep. of Germany | 297/194 |
| 1555210 | 1/1969 | France | 108/44 |

Primary Examiner—Kenneth J. Dorner
Assistant Examiner—José V. Chen
Attorney, Agent, or Firm—Price, Heneveld, Cooper, De Witt & Litton

[57] ABSTRACT

A container holder for a vehicle is stored in an armrest and can be moved to a use position exposing a container supporting element. The container supporting element includes an aperture with adjustable dimensions for engaging the sides of different diameter containers and a movable floor permitting compact storage and improved stability for holding containers.

13 Claims, 2 Drawing Sheets

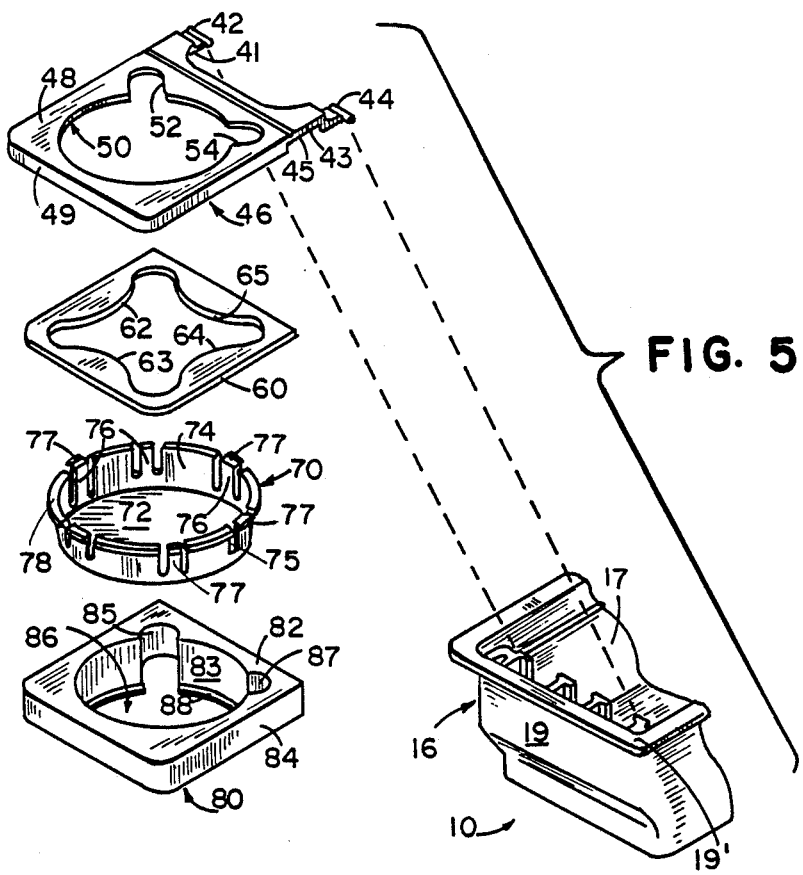
FIG. 5
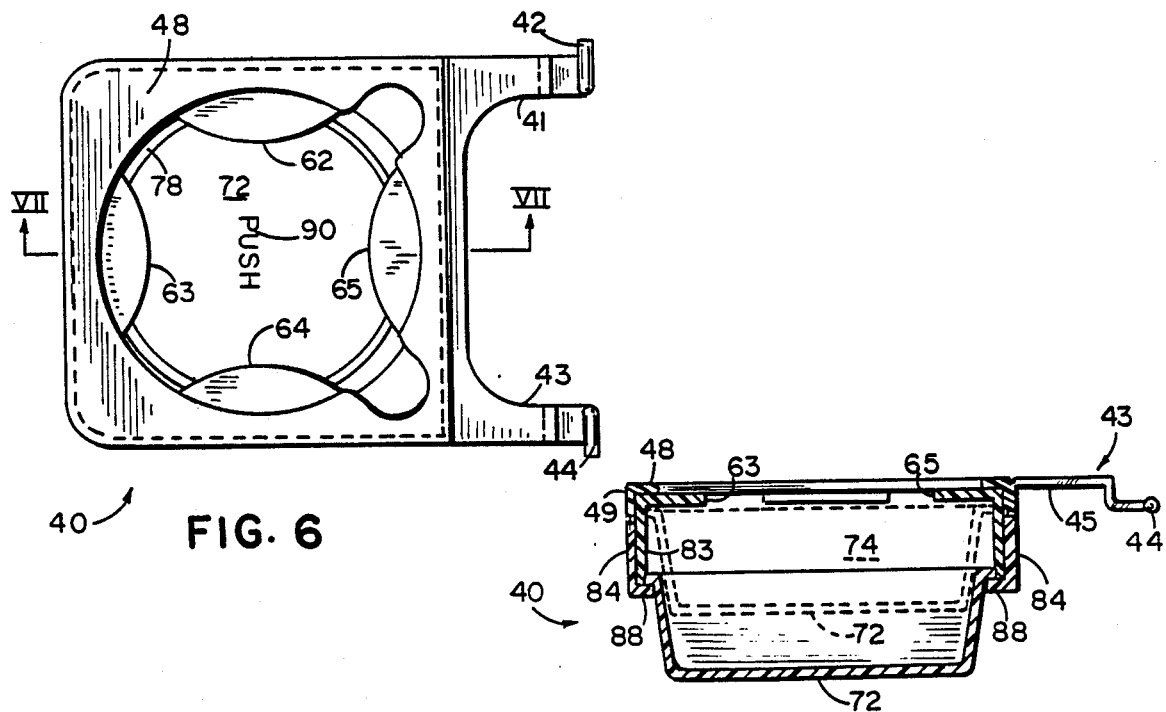
FIG. 6
FIG. 7

CONTAINER HOLDER FOR A VEHICLE

The present application is a continuation-in-part application of pending application Ser. No. 944,989, now U.S. Pat. No. 4,792,184 filed Dec. 2, 1986, entitled CONTAINER HOLDER FOR A VEHICLE to Lindberg et al. The subject matter of this prior application is incorporated herein by reference.

BACKGROUND OF THE INVENTION

The present invention relates to holders for a container and particularly to one for use in connection with a vehicle and more particularly an armrest within a vehicle.

There exists a variety of cup holders or container holders utilized for supporting cups, cans and other beverage containers in a vehicle such that the vehicle occupants can support such beverage containers while in the vehicle. U.S. Pat. No. 4,417,764 issued Nov. 29, 1983 is representative of one cup holder structure which is incorporated in the armrest of a vehicle and which can accommodate such containers. U.S. Pat. No. 3,326,445 discloses a disposable container holder for use on a car seat. U.S. Pat. Nos. 3,497,076 and 4,040,659 also disclose cup holders which move from a storage position within a support structure in an automobile to a use position.

Although these various cup holders are useful for single or limited sized containers, the system of the present invention is adapted to accommodate a variety of different sized beverage containers such as cans, coffee mugs, large cups and the like.

SUMMARY OF THE PRESENT INVENTION

Container holders embodying the present invention includes a support structure within a vehicle for the holder and a holder movably mounted within the support for movement between stored and use positions. The holder includes a container supporting element extending in a generally horizontal plane when in a use position with the element including means defining an aperture of adjustable dimensions for engaging the sidewalls of a beverage container and a floor which is movable between a raised stored position and a lowered use position.

In one embodiment of the invention, the means for defining an aperture comprises a plurality of resilient members extending inwardly from an edge of an aperture formed in the horizontal support element. In a preferred embodiment of the invention, the cup holder is mounted within an armrest of a vehicle and can be pivoted or otherwise movably mounted thereto between a stored position within the armrest and a use position extended from the armrest.

These and other features, objects and advantages of the present invention will become apparent upon reading the following description thereof together with reference to the accompanying drawings in which:

BRIEF DESCRIPTION OF THE DRAWINGS

FIG. 5 is an exploded fragmentary view of a armrest incorporating a container supporting member of the present invention;

FIG. 6 is a top plan view of the container holder shown in FIG. 5; and

FIG. 7 is a cross sectional view taken along section lines VII—VII in FIG. 6 partly in phantom form showing the operation of the movable floor of the container holder.

DETAILED DESCRIPTION OF THE PREFERRED EMBODIMENT

Figure 1:
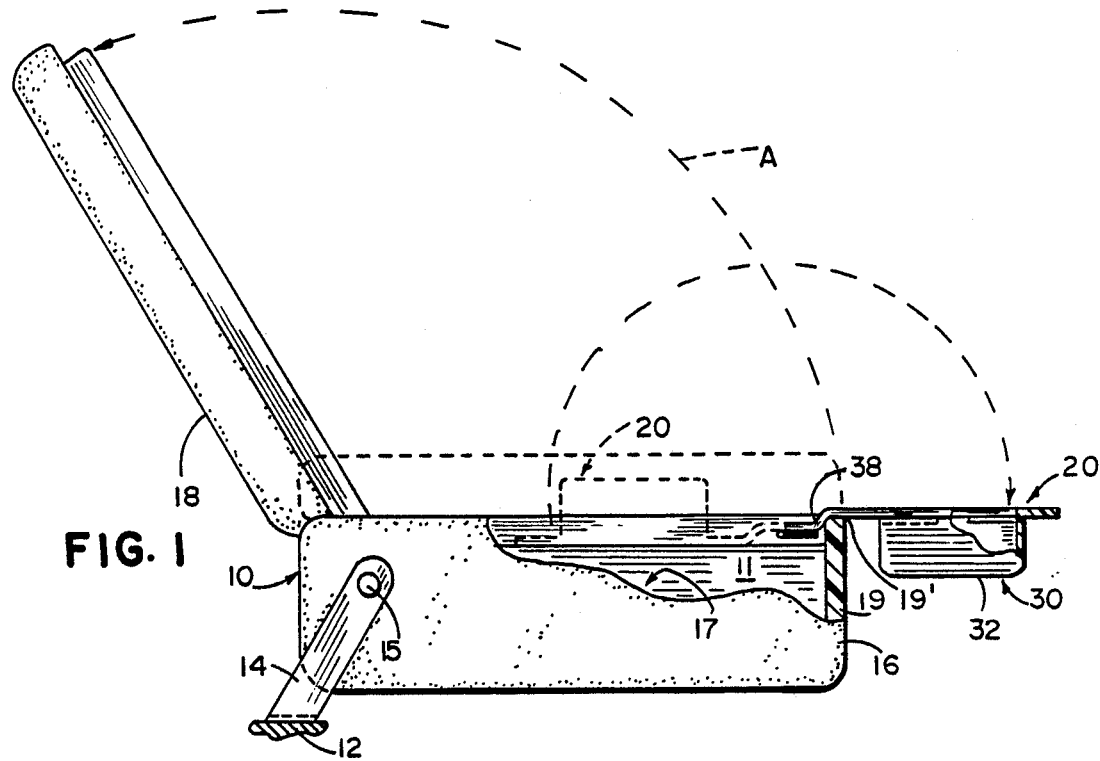
FIG. 1 is a right side elevational view of an armrest incorporating a container supporting member shown partly in cross-section and partly in phantom form.

Referring initially to FIG. 1 there is shown an armrest 10 which is secured to a vehicle 12 by one or more suitable mounting brackets 14. In the embodiment shown, bracket 14 pivotally mounts the armrest to the vehicle through pivot mounting member 15 such that the entire armrest can be lowered for use as shown, or raised for storage. The armrest 10 includes a lower storage housing 16 which defines an interior storage compartment 17. The armrest also includes a cover 18 which is pivoted along its rear edge to the rear of housing 16 such that it can be moved between a closed position shown in phantom form in FIG. 1 and an open position shown in solid form in FIG. 1 by pivoting in a direction indicated by arrow A. Pivotally mounted to the forward edge of the inside of compartment 17 near the front wall 19 of the housing 16 is a container holder 20 embodying the present invention.

The container holder 20 comprises a generally planar container supporting element 22 having a central circular aperture 24 extending downwardly therethrough and having a diameter slightly larger than the diameter of the largest container desired to be held therein. The support element 22 integrally includes in the preferred embodiment four arcuate sector shaped resilient cup support members 21, 23, 25 and 27 which are equally spaced around the periphery of aperture 24 and which project partially inwardly toward the center of the aperture. In the preferred embodiment, the thickness of members 21, 23, 25 and 27 is substantially thinner than that of the support element 22 to provide, in effect, resilient flaps which will easily deflect under the influence of the downward pressure of a container. Support element 22 also includes in the preferred embodiment a cup-shaped floor support 30 as best seen in FIG. 1 which includes a circular floor 32 for supporting the bottom of a container while the resilient flaps support the sidewalls at equally spaced intervals. When containers are positioned in holder 20, the sidewalls are supported by the inner lips 26 of the segments 21, 23, 25 and 27 in spaced relationship around the periphery of the container and in vertical spaced relationship to the floor support 32. This stabilizes the container when inserted into the holder and yet the resilient segments allow easy removal of the container.

Element 22 includes a pair of rearwardly projecting arms 34 and 36 which are pivotally coupled by pivot pins 35 and 37, respectively to the sidewalls 11 and 13 of housing 16. Thus, the holder 20 can be pivoted to a stored position shown in FIG. 2 and in phantom form in FIG. 1 and concealed by the cover 18 of armrest assembly 10 or pivoted outwardly to a horizontally extending use position as illustrated in FIGS. 1 and 3 for receiving a container. In the stored position, the edges of the rectangular element 22 are supported on the tops of sidewalls 11 and 13 which are covered by a suitable padded upholstery material 28 to conform the armrest to the vehicle's interior. In the use position typically the cover 18 of the armrest will be closed and the rearwardly extending arms 34 and 36 include a "S" shaped curved section 38 as best seen in FIG. 1 to conceal the pivot connections 35 and 37 within the housing 16 to allow the arms to be supported on the top lip 19' of the front wall 19 of housing 16 as best seen in FIG. 1.

The cup holder 20 is integrally formed of a suitable polymeric material such as expanded polyvinyl chloride and can be molded as a single piece including the pivot rods 35 and 37. Legs 34 and 36 are sufficiently resilient to allow the legs to be inwardly deflected for snap fitting them into apertures formed in walls 11 and 13 of housing 16. In place of the stationary floor 32 a movable floor section can be employed to provide greater stability for supporting particularly taller containers. Such construction is shown in the embodiment shown in FIGS. 5-7 now described.

Figure 2:
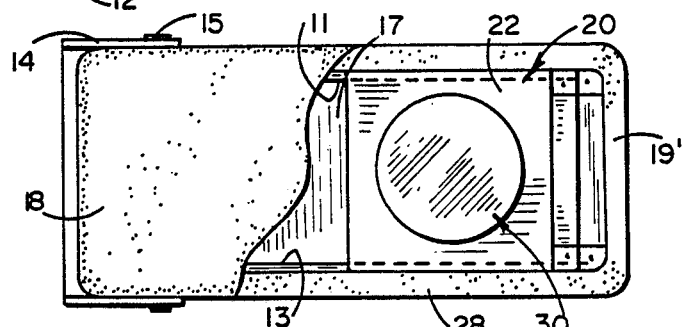
FIG. 2 is a top plan view of the structure shown in FIG. 1 partly broken away to show the container support member in the stored position.
Figure 3:
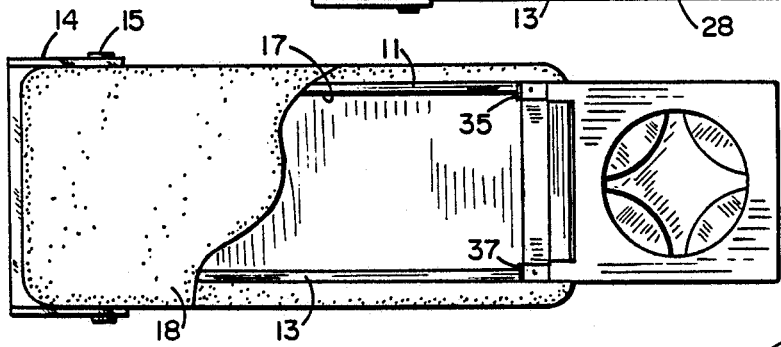
FIG. 3 is a top plan view partly broken away of the structure shown in FIG. 2 showing in the container support member in an extended use position.
Figure 4:
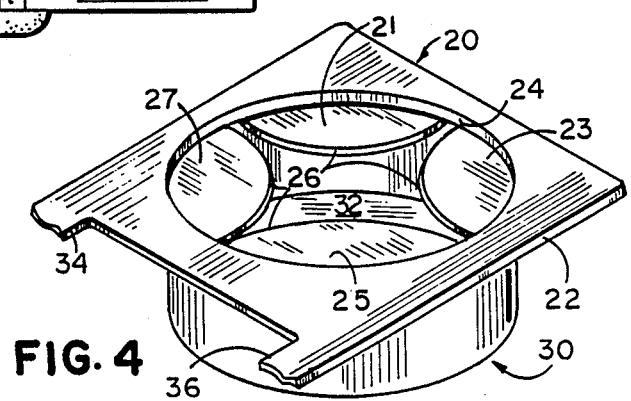
FIG. 4 is an enlarged fragmentary perspective view of the container support member.

The cup holder 40 of this embodiment of the invention is mounted to the armrest 10 shown in detail in FIGS. 1-3 in the same manner as the first embodiment by the utilization of a pair of outwardly extending pivot pins 42 and 44 integrally formed on the upper housing member 46 of cup holder 40. Pins 42 and 44 extend outwardly from ends of arms 41 and 43, respectively which are offset and include a U-shaped channel 45 extending under the junction of the arms and the generally rectangular body of housing 46 as best seen in FIGS. 5 and 7 such that the surface of channel 45 will rest on the top lip 19' of armrest 10 when in an extended use position which is substantially identical to that shown in the embodiment of FIG. 1.

Housing 46 is generally rectangular including an upper surface 48 and a downwardly extending skirt 49. A circular aperture 50 is formed through the upper surface 48 and includes a pair of arcuate slots 52 and 54 extending towards the rear corners of housing 46 to receive handles of containers such as cups. Positioned below and aligned with upper housing 46 is a resilient foam rubber cup retaining member 60 which is generally rectangular and includes four equally spaced arcuate arms 62-65 which grips the sidewalls of a container in the same manner as in the embodiment shown in FIGS. 1-4. The foam pad 60 is compressed between the lower surface of top 48 of member 46 and the upper surface of lower housing 80 as best seen in FIG. 7 once the cup holder 40 is assembled.

Lower housing 80 also is generally rectangular and includes an upper surface 82 and downwardly depending skirt 84 extending around the peripheral edges of the rectangular plate 82. The lower housing 80 also includes a generally cylindrical aperture 86 formed downwardly through the center thereof conforming to the shape of aperture 50 of the upper housing 46 and includes a pair of elongated downwardly extending arcuate slots 85 and 87 interrupting the cylindrical sidewall 83 of aperture 86. At the bottom of the cylindrical sidewall 83 of aperture 86 there is provided an inwardly projecting lip 88 for retaining the movable floor support 70 in place as described below. As seen in FIG. 7, member 80 is of two piece construction with the cylindrical sidewall 83 separately formed and secured to the outer skirt 84 and lip 88 of the housing. The two pieces 83 and 84 are bonded together during assembly in a conventional manner.

The movable floor section 70 of the cup holder 40 includes a generally cup-shaped member having a floor 72 and a cylindrical sidewall 74 with a plurality of serrations 75 formed through the sides and extending partially down the sides to define flexible fingers 76 having outwardly projecting tips 77. Fingers 76 are molded such that tips 77 extend slightly beyond the outer edge of a circular rim 78 formed along the top edge of cylindrical wall 74 to provide frictional engagement with the sidewall 83 of lower housing 80. This contact of tips 77 of fingers 76 at spaced locations around the periphery of rim 78 stabilizes the movement of and provides a sliding interfit between member 70 and housing 80. Thus, movable floor 70 can be raised to a position shown in phantom lines in FIG. 7 for compact storage of the cup holder or pushed downwardly into a use position shown in solid lines in FIG. 7. Floor 72 includes the printed indicia 90 "PUSH" formed at the center of floor 72 as seen in FIG. 6 to indicate to the user that the floor is movable downwardly for providing a greater vertical spacing between the upper surface of floor 72 and the engagement by edges 62-65 of foam pad 60 thereby providing greater stability for holding containers. Lip 78 as best seen in FIG. 7 engages the inwardly projecting lip 88 of housing 80 for holding the movable floor member 70 within the confines of the upper housing 46 and lower housing 80.

It will become apparent to those skilled in the art the various modifications to the preferred embodiments of the invention described herein can be made without departing from the spirit or scope thereof as defined by the appended claims.

The embodiments of the invention in which an exclusive property or privilege is claimed are defined as follows.

1. In a vehicle armrest and container holder assembly in which said armrest is adapted for mounting to a vehicle and said holder assembly is adapted to support a container, the improvement comprising:
said armrest having a recess for receiving said container holder assembly in a storage position and means for mounting said holder assembly in a use position extending in a generally horizontal plane; said holder assembly further including a housing and a cup-shaped floor means movably coupled to said housing for movement between a raised position substantially positioned within said housing for producing a reduced depth of said holder assembly for compact storage of the container holder assembly in the armrest, and a lowered position extended downwardly from the lower end of said housing to increase the depth of said holder assembly for use in supporting the bottom of a container whereby said floor means can be raised and said assembly compactly stored in said recess when said holder assembly is not used and can be moved downwardly to said use position for supporting a container.

2. The apparatus as defined in claim 1 wherein said housing includes an aperture formed therein for receiving a generally cylindrical container and said holder further includes resilient sections extending toward the center of said aperture for deflection upon insertion of a container therein such that said sections engage the sides of the container.

3. A vehicle armrest and container holder assembly comprising:
- an armrest for mounting to a vehicle and including a container supporting housing extending in a generally horizontal plane for use, said holder further including floor means movably coupled to said housing for movement between a raised position substantially positioned within said housing for compact storage of the container holder in the armrest and a lowered position for use in supporting the bottom of a container, wherein said housing includes an aperture formed therein for receiving a generally cylindrical container and said holder further includes resilient sections extending toward the center of said aperture for deflection upon insertion of a container therein such that said sections engage the sides of the container; and wherein said floor means comprises a cup-shaped member including outwardly projecting fingers engaging said housing to slidably couple said floor means to said housing.

4. The apparatus as defined in claim 3 wherein said housing includes a generally cylindrical sidewall and a lip extending inwardly from a lower edge of said cylindrical sidewall for captively engaging said projecting fingers of said cup-shaped member for supporting said cup-shaped member when moved to a lowered position.

5. The apparatus as defined in claim 4 wherein said housing includes an arcuate slot formed within said cylindrical sidewall of said housing for accommodating the handle of the container positioned therein.

6. The apparatus as defined in claim 5 wherein said housing includes resilient sections extending toward the center of said aperture for deflection upon insertion of a container therein such that said sections engage the sides of the container.

7. A container holder assembly for a vehicle comprising:
- a container holder;
- a vehicle mounted member with a recess for receiving said container holder in a storage position;
- said container holder being mounted to said member and including a support housing mounted for movement from said storage position to a use position extending in a generally horizontal plane, said support housing including an aperture and said container holder including a movable cup-shaped floor support movable through said aperture to a downwardly extended position below the lower end of said housing for supporting a container when said container holder is in a use position and movable upwardly into a storage position substantially within said housing for compact storage of said container holder in said recess of said member; and
- means for mounting said support housing to said member for movement between a stored position at least partially within said recess and a use position extended from said recess.

8. A container holder assembly for a vehicle comprising:
- a vehicle mounted member with a recess for receiving a container holder;
- a container holder mounted to said member and including a support housing which extends in a generally horizontal plane for use, said support housing including an aperture and a movable floor for supporting a container when in a use position and movable to a storage position substantially within said housing for compact storage of said container holder; wherein said housing includes resilient sections extending toward the center of said aperture for deflection upon insertion of a container therein such that said sections engage the sides of the container, and wherein said floor is defined by a cup-shaped member including outwardly projecting fingers engaging said housing to slidably couple said floor to said housing; and
- means for mounting said support housing to said member for movement between a stored position at least partially within said recess and a use position extended from said recess.

9. The apparatus as defined in claim 8 wherein said housing includes a generally cylindrical sidewall and a lip extending inwardly from a lower edge of said cylindrical sidewall for captively engaging said projecting fingers of said cup-shaped member for supporting said cup-shaped member when moved to a lowered position.

10. The apparatus as defined in claim 9 wherein said housing includes an arcuate slot formed within said cylindrical sidewall of said housing for accommodating the handle of the container positioned therein.

11. A container holder assembly for a vehicle comprising:
- a vehicle mounted housing for receiving a container holder assembly;
- a container holder assembly mounted to said housing and including a support means which extends to a use position in a generally horizontal plane, said support means including an opening having a plurality of arcuate-shaped resilient flap means extending partially inwardly from an edge of said opening to define an aperture of selectable dimensions extending generally vertically therein for receiving and supporting containers of different sizes which extend vertically downwardly through said aperture, said container holder assembly further including a cup-shaped support floor means spaced below said flap means for supporting the bottom of a container thereon; and
- means for mounting said support floor means to said support means for movement between a stored position at least partially within said support means to said use position extended downwardly from said support means when said support means is extended in a generally horizontal use position from said vehicle mounted housing.

12. The apparatus as defined in claim 11 wherein said resilient flap means deflect upon insertion of a container therein such that said flap means engage the sides of the container in vertically spaced relationship to said floor.

13. The apparatus as defined in claim 11 wherein said support means includes arm means and mounting means for pivotally coupling said arm means to said vehicle mounted housing such that said support means can pivotally move between said stored position and said use position.

* * * * *